Nov. 12, 1957
W. W. ALBRECHT
2,812,689
UNSYMMETRICAL PHOTOGRAPHIC OBJECTIVE
WITH THREE AIR-SPACED MEMBERS
Filed March 10, 1955
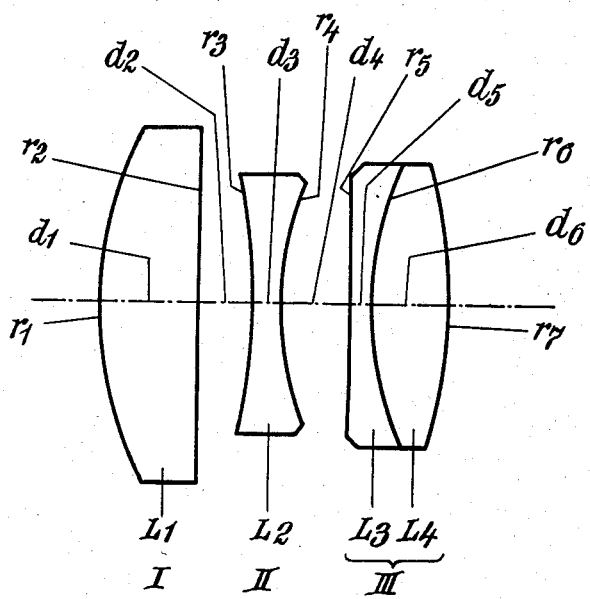
INVENTOR:
Wolfram W. Albrecht
BY
Karl F. Ross
AGENT

United States Patent Office 2,812,689
Patented Nov. 12, 1957

2,812,689

UNSYMMETRICAL PHOTOGRAPHIC OBJECTIVE WITH THREE AIR-SPACED MEMBERS

Wolfram Wilhelm Albrecht, Kreuznach, Rhineland, Germany, assignor to Jos. Schneider & Co., Kreuznach, Germany Application March 10, 1955, Serial No. 493,493

Claims priority, application Germany March 13, 1954

1 Claim. (Cl. 88—57)

The present invention relates to an unsymmetrical photographic objective of the type having three air-spaced members, including a front member (i. e. a member facing the side of the longer light rays) in the form of a simple collective lens, a collective rear member (next to the image plane) in the form of a compound lens consisting of two components of opposite refractivity whose cemented surface has a forwardly directed convexity facing the diaphragm space, and a simple dispersive lens bracketed between the two collective members.

Systems of this character, while being of relatively simple construction, are optically quite satisfactory over a sufficiently large image area, especially when designed so that the first air space (between the front member and the intermediate, dispersive member) ranges in length between approximately 50% and 80% of the second air space (between the dispersive member and the compound rear member) which encloses the diaphragm. Further improvement is afforded by the availability of highly refractive glass, it having been found that many aberrations may be reduced and eliminated by making some or all of the lenses in such systems of a material whose refractive index for the yellow helium line of the spectrum is greater than 1.61.

The present invention has for its object the provision of an optical system of the character outlined above which is thoroughly corrected for spherical and chromatic aberrations, coma, astigmatism and image curvature.

A feature of this invention resides in the use of highly refractive material for all the lenses of such a system, and especially for the collective front lens as well as for the rear, positive component of the compound rear lens. Preferably, the refractive index of the front lens is greater than 1.67 and that of the positive rear component is greater than 1.71 whereas the refractive indices of the two remaining lens elements should not exceed 1.64 and should be approximately equal to each other.

Another feature of this invention resides in the use of a relatively thick front lens whose center thickness is at least 9% of the overall focal length of the objective.

A further feature of this invention in such a design of the compound rear member that the radius of its cemented surface is equal to or greater than 95% of the total physical (axial) length of the system.

An embodiment of the invention has been illustrated schematically in the sole figure of the accompanying drawing.

The optical system shown in the drawing comprises a front member I consisting of a single, positive lens L1 having radii $r_1$, $r_2$ and a thickness $d_1$. Spaced from this member by a distance $d_2$ is a central member II consisting of a single, negative lens L2 having radii $r_3$, $r_4$ and a thickness $d_3$. Central member II and a compound, positive rear member III define a diaphragm space of length $d_4$. Member III consists of a negative forward component L3 having a thickness $d_5$ and radii $r_5$, $r_6$, the latter radius being that of the cemented surface, and of a positive rear component L4 having radii $r_6$, $r_7$ and thickness $d_6$. It will be noted that lenses L2 and L4 are distinctly biconcave and biconvex, respectively, and that lenses L1 and L3 are very nearly plano-convex and plano-concave, respectively.

Typical numerical values for the parameters of the illustrated system are given, by way of example, in the following table and are to be understood as based upon an overall focal length of numerical value 100, the table also showing the refractive indices $n_d$ and the Abbé numbers $\nu_d$ of the several lenses. The relative aperture of the system is 1:3.5.

| | | | | | |
|---|---|---|---|---|---|
| (I) | L1 | $r_1=+\ 37.3$ | $d_1=9.79$ | $n_d=1.69347$ | $\nu_d=53.5$ |
| | | $r_2=+1,373.0$ | $^1d_2=4.77$ | | |
| (II) | L2 | $r_3=-\ 70.6$ | $d_3=2.84$ | $n_d=1.62004$ | $\nu_d=36.3$ |
| | | $r_4=+\ 32.4$ | $^2d_4=7.06$ | | |
| (III) | L3 | $r_5=-\ 415.4$ | $d_5=2.17$ | $n_d=1.62364$ | $\nu_d=36.7$ |
| | L4 | $r_6=+\ 33.5$ | $d_6=7.20$ | $n_d=1.74472$ | $\nu_d=44.7$ |
| | | $r_7=-\ 50.6$ | | | |
| | | | $d_{total}=33.83$ | | |

[1] Air space.
[2] Diaphragm space.

It will be noted that the first air space $d_2$ ranges between 50% and 80% of the second air space or diaphragm space $d_4$, that all indices of refraction $n_d$ are greater than 1.61 but less than 1.75 and in the case of lenses L1 and L4 are greater than 1.67 and 1.71, respectively, the indices of the remaining lenses L2, L3 being substantially alike (as are also their Abbé numbers) and less than 1.64. Also, the thickness $d_1$ of front lens L1 is greater than 9% but less than 15% of the overall focal length of numerical value 100. Finally, the radius $r_6$ of the cemented surface of member III exceeds 95% but is less than 125% of the overal length $d_{total}$ of the system. Objectives constructed in accordance with the present disclosure have been found to exhibit a substantial reduction and, with certain zones, complete elimination of residual aberrations, particularly astigmatism and coma.

I claim:

An objective system having a relative aperture of 1:3.5 and an overall focal length of numerical value 100, comprising three air-spaced members including a positive front member in the form of a simple first lens, a negative intermediate member in the form of a simple second lens and a compound rear member consisting of a negative third lens representing a forward component and a positive fourth lens representing a rear component cemented together, said intermediate and rear members together defining a diaphragm space, the cemented surface of said components being convex toward said diaphragm space, wherein the radii $r_1$, $r_2$ and the thickness $d_1$ of said first lens L1, the air space $d_2$ between said first and second lenses, the radii $r_3$, $r_4$ and the thickness $d_3$ of said second lens L2, the air space $d_4$ between said second and third lenses, the radii $r_5$, $r_6$ and the thickness $d_5$ of said third lens L3, the radii $r_6$, $r_7$ and the thickness $d_6$ of said fourth lens L4, the refractive indices $n_d$ of all of said lenses and the Abbé numbers $\nu_d$ thereof have numerical values substantially as given in the following table:

| | | | | |
|---|---|---|---|---|
| $L_1$ | $r_1=+\ \ 37.3$ | $d_1=9.79$ | $n_d=1.69347$ | $\nu_d=53.5$ |
| | $r_2=+1,373.0$ | $^1d_2=4.77$ | | |
| $L_2$ | $r_3=-\ \ 70.6$ | $d_3=2.84$ | $n_d=1.62004$ | $\nu_d=36.3$ |
| | $r_4=+\ \ 32.4$ | $^2d_4=7.06$ | | |
| $L_3$ | $r_5=-\ \ 415.4$ | $d_5=2.17$ | $n_d=1.62364$ | $\nu_d=36.7$ |
| $L_4$ | $r_6=+\ \ 33.5$ | $d_6=7.20$ | $n_d=1.74472$ | $\nu_d=44.7$ |
| | $r_7=-\ \ 50.6$ | | | |

¹ Air space.
² Diaphragm space.

References Cited in the file of this patent
UNITED STATES PATENTS

| | | |
|---|---|---|
| 721,240 | Rudolph | Feb. 24, 1903 |
| 2,158,178 | Frederick et al. | May 16, 1939 |
| 2,308,007 | Herzberger et al. | Jan. 12, 1943 |
| 2,346,086 | Schade et al. | Apr. 4, 1944 |
| 2,732,762 | Lange et al. | Jan. 31, 1956 |

FOREIGN PATENTS

| | | |
|---|---|---|
| 672,822 | Great Britain | May 28, 1952 |
| 706,605 | Great Britain | Mar. 31, 1954 |